(12) United States Patent
Gong et al.

(10) Patent No.: US 11,687,200 B2
(45) Date of Patent: Jun. 27, 2023

(54) DISPLAY PANEL, CONTROL METHOD THEREOF, AND DISPLAY DEVICE

(71) Applicant: Wuhan Tianma Micro-Electronics Co., Ltd., Wuhan (CN)

(72) Inventors: Houfu Gong, Wuhan (CN); Zhenhua Liang, Wuhan (CN); Han Wu, Wuhan (CN); Zhenyuan Zhang, Wuhan (CN); Jun Li, Wuhan (CN); Zhihua Yu, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 347 days.

(21) Appl. No.: 17/019,773

(22) Filed: Sep. 14, 2020

(65) Prior Publication Data

US 2022/0035484 A1 Feb. 3, 2022

(30) Foreign Application Priority Data

Jul. 31, 2020 (CN) .......................... 202010755487.X

(51) Int. Cl.
*G06F 3/044* (2006.01)
*G06F 3/041* (2006.01)
*H04N 23/57* (2023.01)

(52) U.S. Cl.
CPC .......... *G06F 3/0443* (2019.05); *G06F 3/0412* (2013.01); *G06F 3/0446* (2019.05); *G06F 3/041662* (2019.05); *G06F 2203/04103* (2013.01); *G06F 2203/04111* (2013.01); *G06F 2203/04112* (2013.01); *H04N 23/57* (2023.01)

(58) Field of Classification Search
CPC ... G06F 3/443; G06F 3/0412; G06F 3/041662
USPC ........................................................... 345/174
See application file for complete search history.

(56) References Cited

U.S. PATENT DOCUMENTS

| 2013/0161177 A1* | 6/2013 | Lee | ..................... G06F 3/04164 200/512 |
| 2016/0202789 A1* | 7/2016 | Kim | ..................... G06F 3/0446 345/174 |
| 2019/0012512 A1* | 1/2019 | He | ..................... G02F 1/13338 |

FOREIGN PATENT DOCUMENTS

| CN | 108008855 A | 5/2018 |
| CN | 110047852 A | 7/2019 |
| CN | 110489012 A | 11/2019 |
| CN | 110580113 A | 12/2019 |

* cited by examiner

*Primary Examiner* — Calvin C Ma
(74) *Attorney, Agent, or Firm* — Anova Law Group PLLC

(57) ABSTRACT

A display panel, a display device and a control method are provided. The display panel includes a display area and a non-display area, a base substrate, and touch electrodes on a side of the base substrate facing a light-exiting surface of the display panel. The display area includes a first display area and a second display area that at least partially surrounds the first display area, the touch electrodes are at least distributed in the display area, the touch electrodes at least include a first touch electrode located in the first display area, the first touch electrode includes at least one first touch electrode unit, and the first touch electrode unit includes at least one hollowed part, along a direction perpendicular to the base substrate, the hollowed part runs through the first touch electrode unit, and the first touch electrode is a self-capacitive touch electrode.

17 Claims, 11 Drawing Sheets

DISPLAY PANEL, CONTROL METHOD THEREOF, AND DISPLAY DEVICE

CROSS-REFERENCE TO RELATED APPLICATION

This application claims priority of Chinese Patent Application No. 202010755487.X, filed on Jul. 31, 2020, the entire content of which is hereby incorporated by reference.

FIELD OF THE DISCLOSURE

The present disclosure generally relates to the field of display technology and, more particularly, relates to a display panel, a control method thereof, and a display device.

BACKGROUND

With development of display technology, display panels may have higher and higher screen-to-body ratios. Full-screen display has received widespread attention due to their narrow-frame or even frameless display effects. Currently, display devices, such as mobile phones and tablet computers, often need to reserve spaces on their front sides for electronic light-capturing elements that are commonly used, such as front cameras, infrared sensing devices, and fingerprint recognition devices. These light-capturing elements may be disposed on top front portions of the display devices, forming non-display areas at corresponding locations, and thus reducing the screen-to-body ratios of the display devices.

In existing technologies, to increase the screen-to-body ratios, high light transmittance areas may be disposed in display areas of display panels to accommodate light-capturing components.

With development of full-screen display, more electronic light-capturing components may need to be integrated under screens. For example, a semi-transparent area may be set on a display screen, and a camera may be disposed under the screen and in the semi-transparent area correspondingly. In a normal display state, the semi-transparent area may play a display function. When it is necessary to take pictures or videos, the camera may shoot through the semi-transparent area. Thus, the semi-transparent area may realize functions of display and shooting simultaneously. When a touch electrode is disposed in the semi-transparent area, introduction of the touch electrode may reduce the light transmittance of the semi-transparent area, and photosensitive performance of the light-capturing component may be affected.

SUMMARY

One aspect of the present disclosure includes a display panel. The display panel includes a display area and a non-display area, a base substrate, and touch electrodes on a side of the base substrate facing a light-exiting surface of the display panel. The display area includes a first display area and a second display area that at least partially surrounds the first display area, the touch electrodes are at least distributed in the display area, the touch electrodes at least include a first touch electrode located in the first display area, the first touch electrode includes at least one first touch electrode unit, and the first touch electrode unit includes at least one hollowed part, along a direction perpendicular to the base substrate, the hollowed part runs through the first touch electrode unit, and the first touch electrode is a self-capacitive touch electrode.

Another aspect of the present disclosure includes a display device. The display device includes a display panel. The display panel includes a display area and a non-display area, a base substrate, and touch electrodes on a side of the base substrate facing a light-exiting surface of the display panel. The display area includes a first display area and a second display area that at least partially surrounds the first display area, the touch electrodes are at least distributed in the display area, the touch electrodes at least include a first touch electrode located in the first display area, the first touch electrode includes at least one first touch electrode unit, and the first touch electrode unit includes at least one hollowed part, along a direction perpendicular to the base substrate, the hollowed part runs through the first touch electrode unit, and the first touch electrode is a self-capacitive touch electrode. The display device also includes a light-capturing component. The light-capturing component is located on a side of the display panel away from the light-exiting surface. The light-capturing component includes a light-capturing unit. An orthographic projection of the light-capturing unit on the base substrate falls within a range of an orthographic projection of the hollowed part of the first touch electrode unit on the base substrate.

Another aspect of the present disclosure includes a control method of a display panel. The control method includes a first touch stage and a second touch stage. The display panel includes a display area and a non-display area, a base substrate, and touch electrodes on a side of the base substrate facing a light-exiting surface of the display panel. The display area includes a first display area and a second display area that at least partially surrounds the first display area, the touch electrodes are at least distributed in the display area, the touch electrodes at least include a first touch electrode located in the first display area, the first touch electrode includes at least one first touch electrode unit, and the first touch electrode unit includes at least one hollowed part, along a direction perpendicular to the base substrate, the hollowed part runs through the first touch electrode unit, and the first touch electrode is a self-capacitive touch electrode. In the first touch stage, a touch detection is performed on the first display area. A touch detection signal is sent to the first touch electrode unit in the first display area, and a touch sensing signal is received through the first touch electrode unit. In the second touch stage, a touch detection is performed on the second display area. A touch detection signal is sent to the touch electrode located in the second display area, and a touch sensing signal fed back by the touch electrode in the second display area is received.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure more clear and explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

For a full-screen display, a semi-transparent area may be set on a display screen, and a camera may be disposed under the screen and in the semi-transparent area correspondingly. In a normal display state, the semi-transparent area may play a display function. When it is necessary to take pictures or videos, the camera may shoot through the semi-transparent area. Thus, the semi-transparent area may realize functions of display and shooting simultaneously. When a touch electrode is disposed in the semi-transparent area, introduction of the touch electrode may reduce the light transmittance of the semi-transparent area, and photosensitive performance of the light-capturing component may be affected.

The present disclosure provides a display panel and a control method thereof, and a display device. For example, the display panel may include a first display area with increased light transmittance, while having a touch function.

Figure 1:
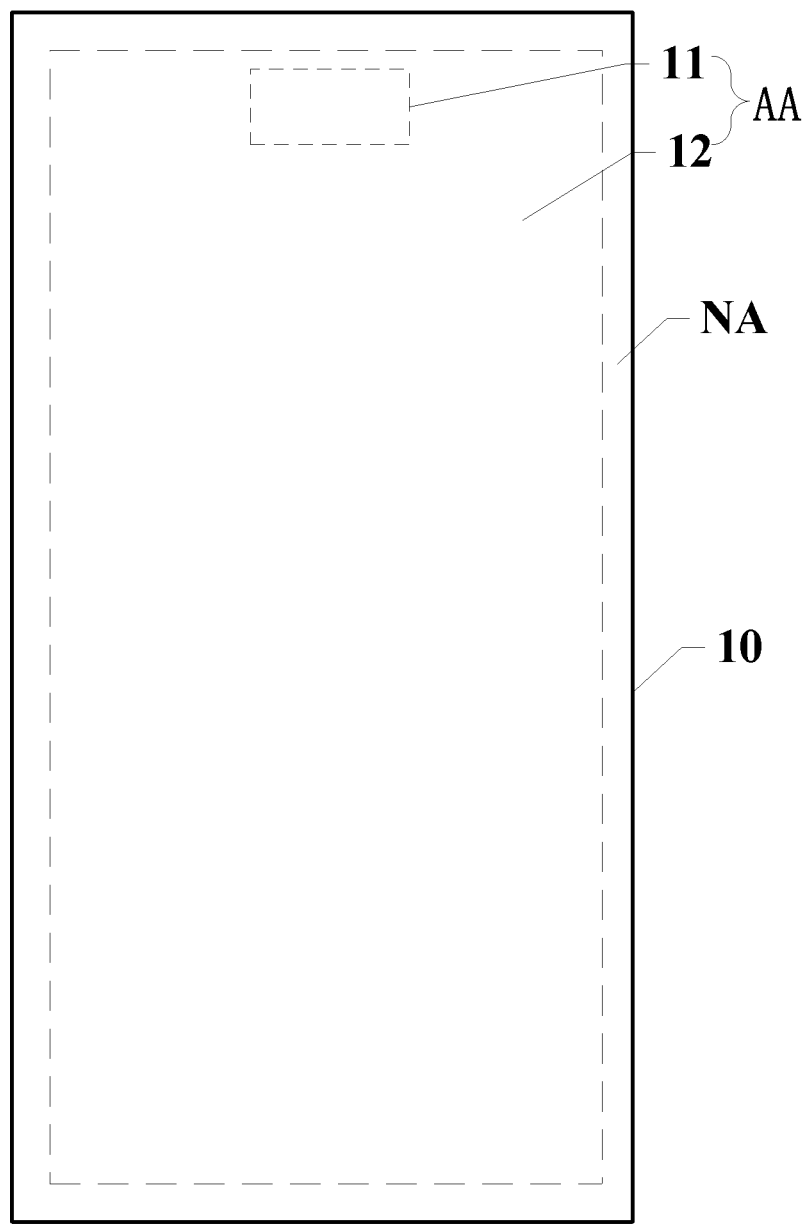
FIG. 1 illustrates a top view of a display panel consistent with the disclosed embodiments of the present disclosure.
Figure 2:
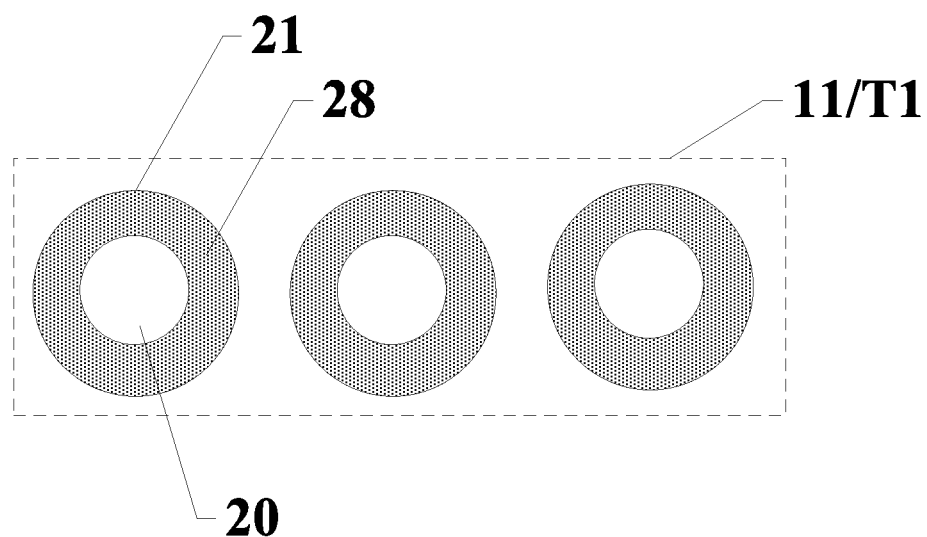
FIG. 2 illustrates a structural diagram of a first touch electrode in a first display area, consistent with the disclosed embodiments of the present disclosure.

FIG. 1 illustrates a top view of a display panel consistent with the disclosed embodiments of the present disclosure. FIG. 2 illustrates a structural diagram of a first touch electrode in a first display area, consistent with the disclosed embodiments of the present disclosure. With reference to FIG. 1 and FIG. 2, the present disclosure provides a display panel 100 including a display area AA and a non-display area NA. The display area AA includes a first display area 11 and a second display area 12. The second display area 12 at least partially surrounds the first display area 11.

The display panel 100 includes a base substrate 10, and touch electrodes (not shown in FIG. 1) at a side of the base substrate 10 facing a light-emitting surface of the display panel 100. The touch electrodes are at least disposed in the display area AA. The touch electrodes at least include a first touch electrode T1 located in the first display area 11.

The first touch electrode T1 includes at least a first touch electrode unit 21, and the first touch electrode unit 21 includes at least a hollowed part 20. Along a direction perpendicular to the base substrate 10, the hollowed part 20 runs through the first touch electrode unit 21. The first touch electrode T1 is a self-capacitive touch electrode.

In one embodiment, as shown in FIG. 1, the display panel 100 may have a rectangular shape. In some other embodiments of the present disclosure, the display panel 100 may have other shapes, such as circle, ellipse or alien structure, etc. FIG. 1 only shows one position of the first display area 11 on the display panel 100. In some other embodiments of the present disclosure, the first display area 11 may also be set in other positions of the display panel 100, and the number of the first display areas 11 may be two or more.

In one embodiment, as shown in FIG. 2, the first display area 11 includes three first touch electrodes T1. In some other embodiments of the present disclosure, the number of first touch electrodes T1 in the first display area 11 may be one, two, or greater than or equal to three. The present disclosure does not limit the number of the first touch electrodes. Further, in one embodiment, as shown in FIG. 2, the first touch electrode unit 21 has a circular outline, and the hollowed part 20 has a circular shape. In some other embodiments, the first touch electrode unit 21 may have an outline with other shapes, such as rectangle, ellipse, hexagon, etc., and the hollowed part 20 may also have other shapes. The present disclosure does not limit the outlines of the first touch electrodes and the shapes of the hollowed parts.

Specifically, with reference to FIG. 1 and FIG. 2, the display area AA of the display panel 100 includes a first display area 11 and a second display area 12 at least partially surrounding the first display area 11. In one embodiment, as shown in FIG. 1, the second display area 12 fully surrounds the first display area 11. In some other implementations, the second display area 12 may half-surround the first display area 11. The present disclosure does not limit whether the second display area 12 fully surround the first display area 11.

The touch electrodes are disposed at least in the first display area 11 and the second display area 12. The touch electrode located in the first display area 11 is a first touch electrode T1, and the first touch electrode T1 is a self-capacitive touch electrode. The first touch electrode T1 includes at least one first touch electrode unit 21. In particular, the first touch electrode unit 21 includes at least one hollowed part 20 running through the first touch electrode unit 21. Due to the hollowed part 20 on the first touch electrode unit 21, an actual coverage area of the first touch electrode unit in the first display area 11 may be reduced, and thus the light transmittance of the first display area 11 disposed with the first touch electrodes may be improved. Accordingly, the first display area 11 may have not only a touch function, but also high light transmittance.

When a light-capturing component is disposed at a position corresponding to the first display area 11, due to the high light transmittance of the first display area, photosensitive performance of the light-capturing component may be improved. In addition, since the first touch electrode T1 in the first display area 11 may be a self-capacitive touch electrode, a manufacturing process of the first touch electrode T1 may be simplified, and the touch performance of the first display area 11 may be ensured. Also, the production yield of the display panel may be improved.

Figure 3:
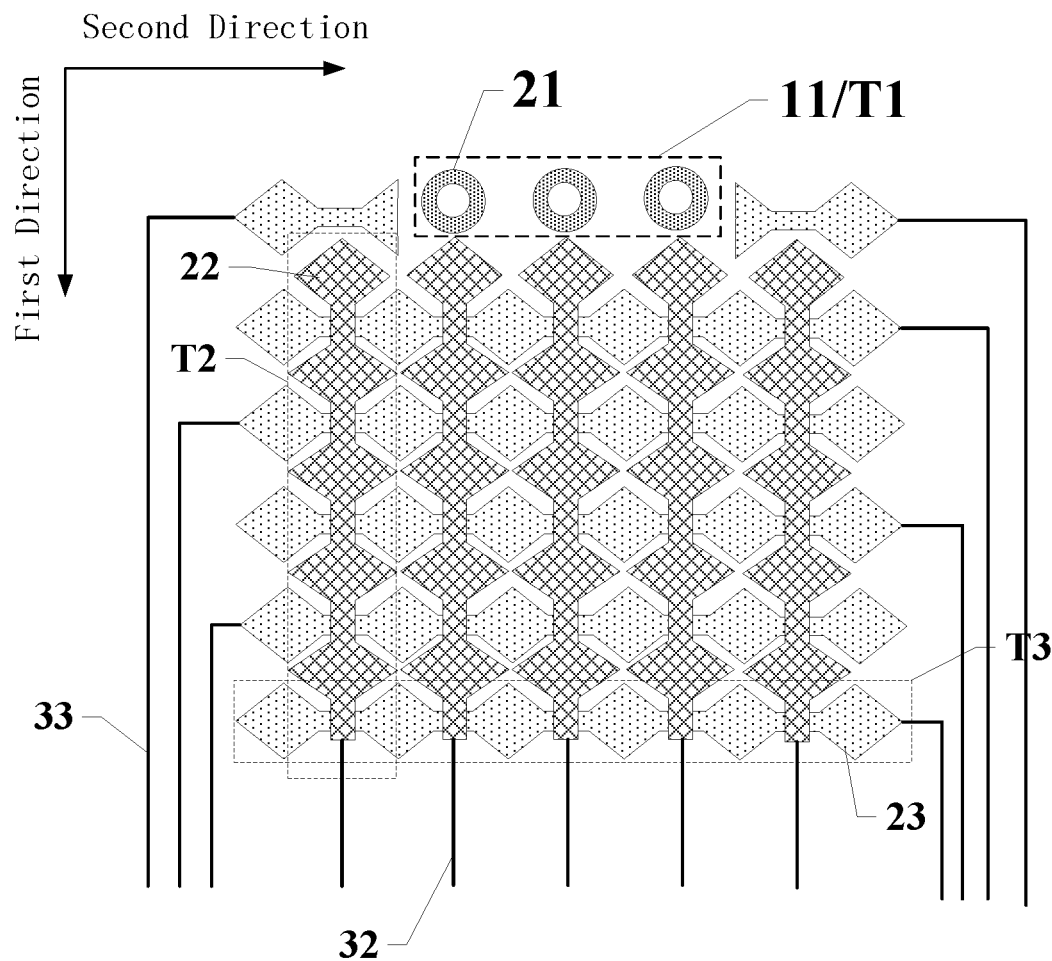
FIG. 3 illustrates an arrangement diagram of touch electrodes on a display panel, consistent with the disclosed embodiments of the present disclosure.

FIG. 3 illustrates an arrangement diagram of touch electrodes on a display panel, consistent with the disclosed embodiments of the present disclosure. In one embodiment, as shown in FIG. 3, the touch electrodes also include a plurality of second touch electrodes T2 and a plurality of third touch electrodes T3 located in the second display area 12. Each second touch electrode T2 includes a plurality of second touch electrode units 22 that are electrically connected, and each third touch electrode T3 include a plurality of third touch electrode units 23 that are electrically connected. The second touch electrode units 22 in a same second touch electrode T2 are arranged along a first direction, and the third touch electrode units 23 in a same third touch electrode T3 are arranged along a second direction. The first direction and the second direction intersect with each other.

The display panel 100 further includes a plurality of second touch leads 32 and a plurality of third touch leads 33. Each second touch electrode T2 is electrically connected to a different second touch lead 32 respectively, and each third touch electrode T3 is electrically connected to a different third touch lead 33 respectively.

Specifically, in one embodiment, as shown in FIG. 3, the touch electrodes in the second display area 12 are mutual capacitive touch electrodes. The touch electrodes in the second display area 12 include a plurality of second touch electrodes T2 arranged in the second direction and a plurality of third touch electrodes T3 arranged in the first direction. The second touch electrodes T2 are electrically connected to different second touch leads 32 respectively, and the third touch electrodes T3 are electrically connected to different third touch leads 33 respectively. Each second touch electrode T2 includes a plurality of second touch electrode units 22 that are electrically connected, and each third touch electrode T3 includes a plurality of third touch electrode units 23 that are electrically connected.

Figure 4:
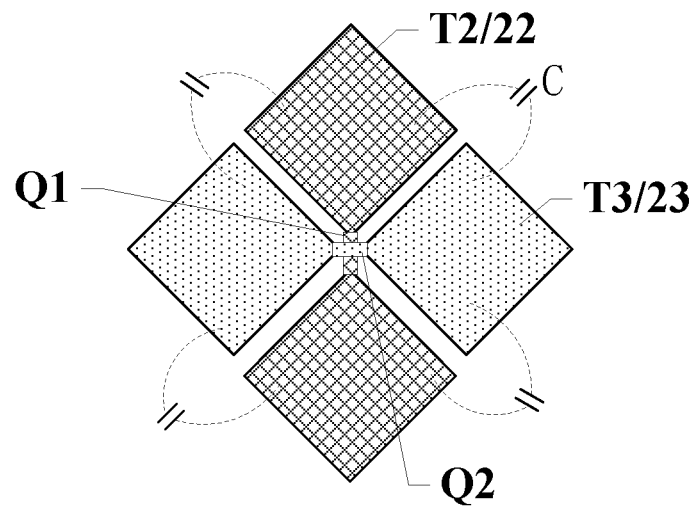
FIG. 4 illustrates a mutual capacitive touch electrode consistent with the disclosed embodiments of the present disclosure.

FIG. 4 illustrates a mutual capacitive touch electrode consistent with the disclosed embodiments of the present disclosure. As shown in FIG. 4, electric field lines may be formed between the second touch electrode T2 and the third touch electrode T3. The number of electric field lines may be proportional to the coupling capacitance C between the second touch electrode T2 and the third touch electrode T3. A larger coupling capacitance C between the second touch electrode T2 and the third touch electrode T3 may result in denser electric field lines between the second touch electrode T2 and the third touch electrode T3. When a touch occurs, a touch object may form a capacitance with the second touch electrode T2 and the third touch electrode T3, and appearance of this capacitance may reduce the number of electric field lines between the second touch electrode T2 and the third touch electrode T3. That is, the coupling capacitance C between the second touch electrode T2 and the third touch electrode T3 may be reduced. Based on the change of the coupling capacitance C between the second touch electrode T2 and the third touch electrode T3, the touch position may be determined.

In one embodiment, the second touch electrode units 22 and the third touch electrode units 23 in the second display area 12 may be arranged on a same layer. Adjacent second touch electrode units 22 may be electrically connected through a first bridge Q1, and adjacent third touch electrode units 23 may be electrically connected through a second bridge Q2. The second bridge Q2, the second touch electrode units 22 and the third touch electrode unit 23 may be disposed on a same layer. The first bridge Q1 and the second touch electrode units 22 are disposed on different layers, and the first bridge Q1 is electrically connected to two adjacent second touch electrode units 22 through vias, respectively. As such, short circuits between the second touch electrode units 22 and the third touch electrode units 23 may be avoided. In addition, since the second touch electrode units 22 and the third touch electrode units 23 may be disposed on a same layer, the distance between adjacent second touch electrode units 22 and third touch electrode units 23 may be reduced. Accordingly, the coupling capacitance C between the adjacent second touch electrode units 22 and the third touch electrode units 23 may be increased. When a touch operation occurs, a change in the coupling capacitance C between the second touch electrode units 22 and the third touch electrode units 23 may be obvious, and thus the touch performance of the display panel 100 may be improved.

Figure 5:
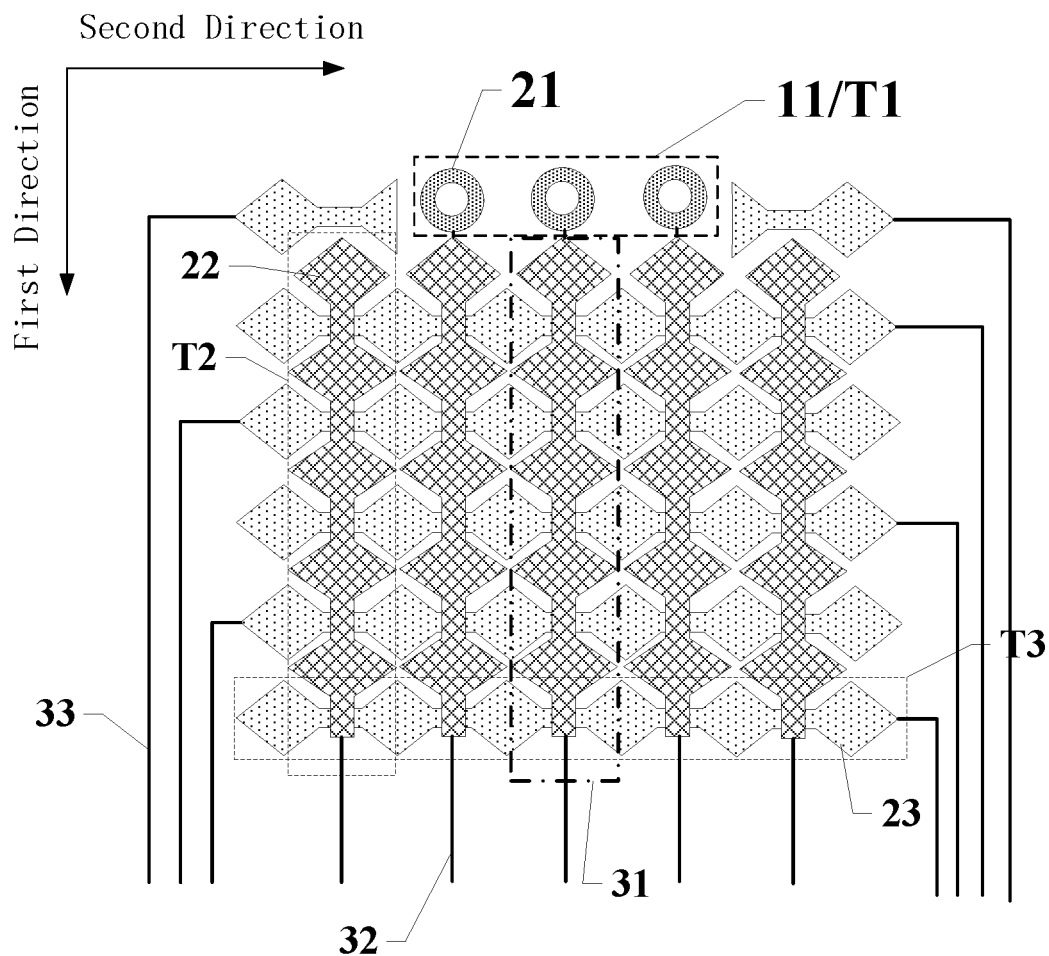
FIG. 5 illustrates another arrangement diagram of touch electrodes on a display panel, consistent with the disclosed embodiments of the present disclosure.

FIG. 5 illustrates another arrangement diagram of touch electrodes on a display panel, consistent with the disclosed embodiments of the present disclosure. In one embodiment, as shown in FIG. 5, the display panel 100 further includes a plurality of first touch leads 31. Each first touch electrode unit 21 is electrically connected to a different first touch lead 31, respectively.

Each first touch electrode unit 21 may be electrically connected to a different second touch electrode T2 by electrically connecting the first touch electrode unit 21 to any one of the second touch electrode units 22 of the second touch electrode T2. The second touch electrode T2 electrically connected to the first touch electrode unit 21 may be multiplexed (e.g., reused) as the first touch lead 31 electrically connected to the first touch electrode unit 21.

Specifically, in one embodiment, as shown in FIG. 5, each first touch electrode unit 21 may be electrically connected to a second touch electrode unit 22 in a different second touch electrodes T2, establishing the electrical connection between the first touch electrode unit 21 and the second touch electrode T2. In a touch stage corresponding to the first display area 11, the second touch electrode T2 electrically connected to the first touch electrode unit 21 may be multiplexed as the first touch lead 31 of the first touch electrode unit 21, and touch signals may thus be received or sent through the second touch electrode T2. In this configuration, since the second touch electrodes T2 of the second display area 12 may be multiplexed as the first touch leads 31, there is no need to separately dispose the first touch leads 31 for the first touch electrode units 21. Accordingly, a manufacturing process of the display panel 100 may be simplified and production efficiency of the display panel 100 may be improved.

Figure 6:
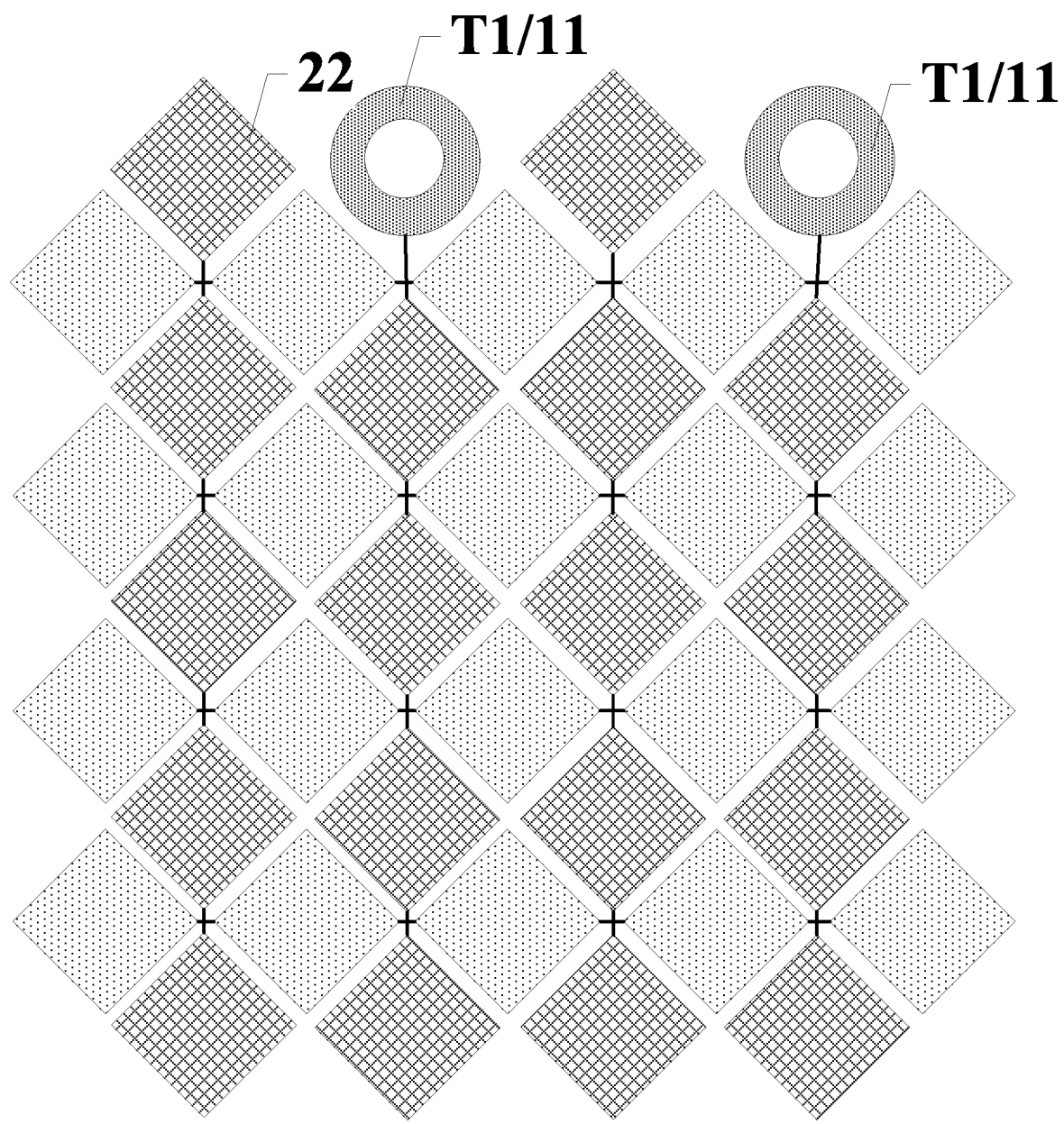
FIG. 6 illustrates another arrangement diagram of touch electrodes on a display panel, consistent with the disclosed embodiments of the present disclosure.

In one embodiment, as shown in FIG. 5, the display panel 100 includes one first display area 11, and the first display area 11 includes three first touch electrodes T1. In some other embodiments of the present disclosure, the number of the first display areas 11 in the display panel 100 may be two or more. FIG. 6 illustrates another arrangement diagram of touch electrodes on a display panel, consistent with the disclosed embodiments of the present disclosure. In one embodiment, as shown in FIG. 6, the display panel 100 includes two first display areas 11, and each first display area 11 includes a first touch electrode T1.

Figure 7:
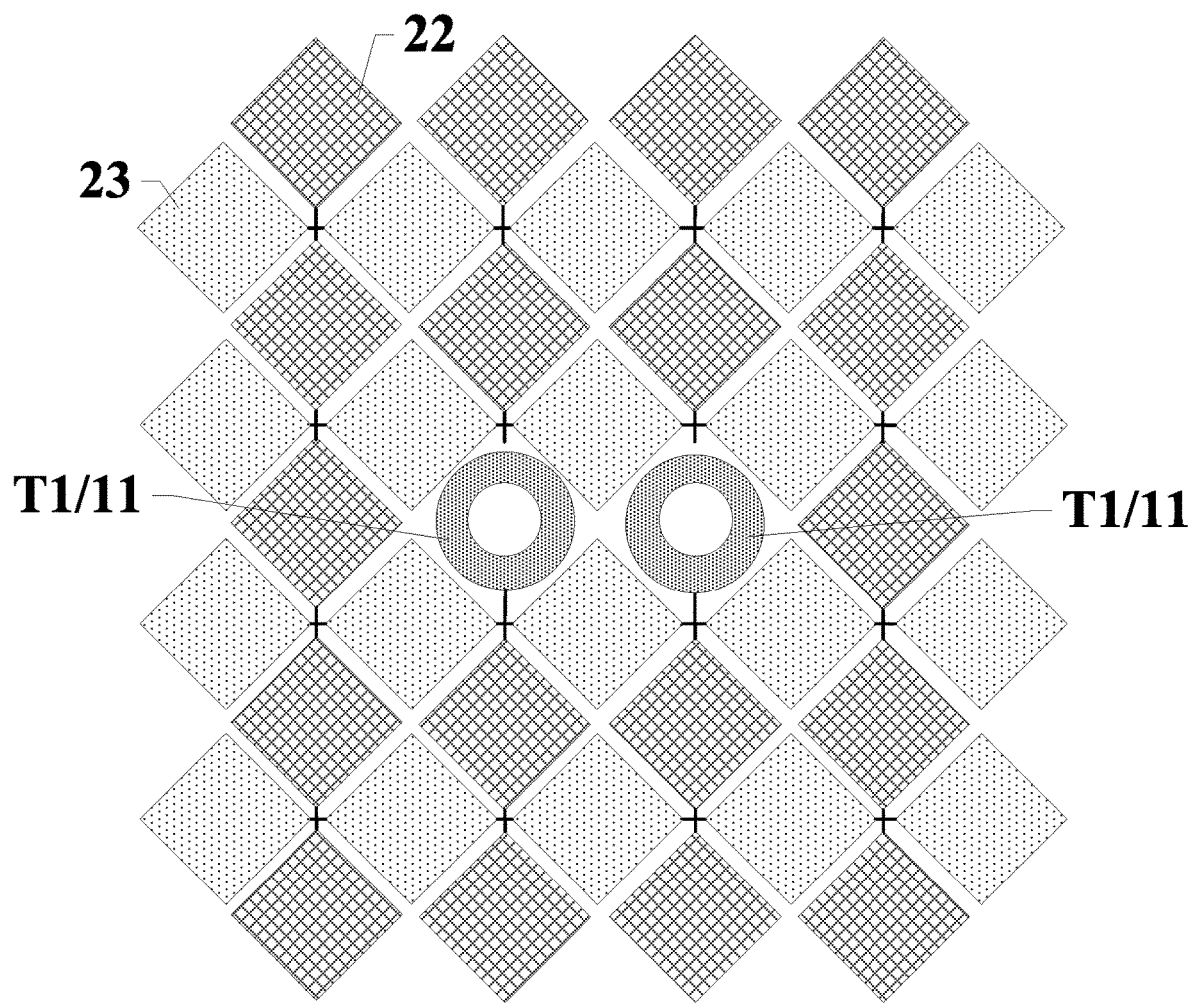
FIG. 7 illustrates another arrangement diagram of touch electrodes on a display panel, consistent with the disclosed embodiments of the present disclosure.

The present disclosure does not limit the number and positions of the first display area 11 and the number of the first touch electrodes T1 included in the first display areas 11. FIG. 7 illustrates another arrangement diagram of touch electrodes on a display panel, consistent with the disclosed embodiments of the present disclosure. In one embodiment, as shown in FIG. 7, the display panel includes two first display areas 11. The first display areas 11 are located in middle of the display panel, and each first display area 11 includes a first touch electrode T1.

Figure 8:
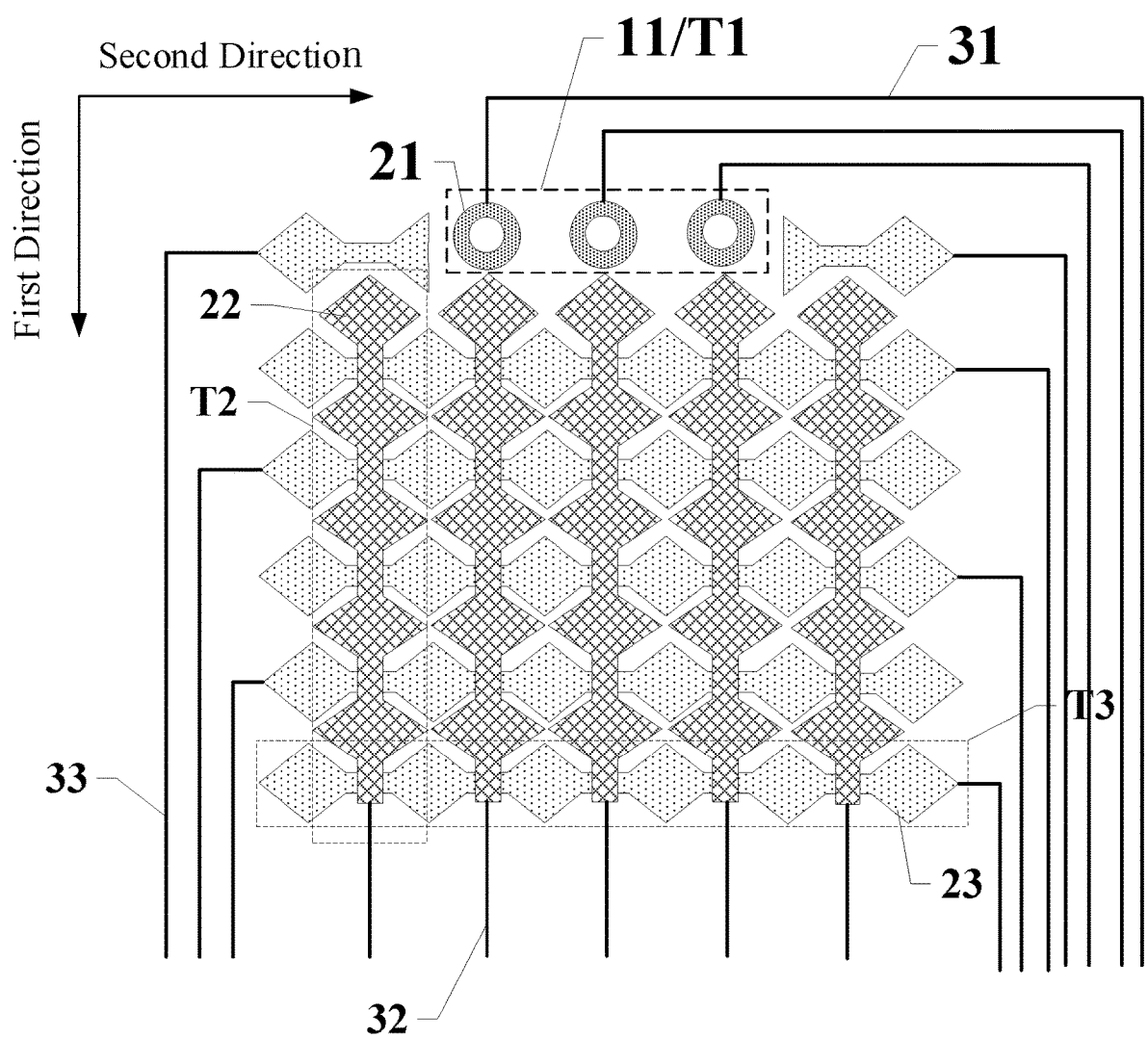
FIG. 8 illustrates another arrangement diagram of touch electrodes on a display panel, consistent with the disclosed embodiments of the present disclosure.

FIG. 8 illustrates another arrangement diagram of touch electrodes on a display panel, consistent with the disclosed embodiments of the present disclosure. In one embodiment, as shown in FIG. 8, the display panel 100 also includes a plurality of first touch leads 31. Each first touch electrode unit 21 is electrically connected to a different first touch lead 31, and the first touch electrode units 21 are insulated from the second touch electrode units 22 and the third touch electrode units 23.

Specifically, as shown in FIG. 8, each first touch electrode unit 21 is electrically connected to a different first touch lead 31, and each first touch electrode unit 21 is insulated from the second touch electrode units 22 and the third touch electrode units 23. In this way, the first touch electrode units 21 may receive and send touch signals through the first touch leads 31 that are separately introduced. That is, the touch process of the first touch electrodes T1 may be performed independently of the second touch electrodes T2 and the third touch electrodes T3, and may not be affected by the touch electrodes in the second display area 12. Accordingly, the touch in the first display area 11 and the touch in the second display area may be performed simultaneously, and thus a control process of the display panel 100 may be simplified.

In one embodiment, as shown in FIG. 8, along the first direction, the first touch electrode unit 21 is located at one side of at least one second touch electrode unit 22. The orthographic projections of the first touch electrode unit 21 and the second touch electrode unit 22 on the base substrate do not overlap.

Specifically, FIG. 8 shows the relative positional relationship between the first touch electrode unit 21 and the second touch electrode units 22. In FIG. 8, the first touch electrode unit 21 and a part of the second touch electrode units 22 are located in a same column, and the first touch electrode unit 21 is located on at least one side of the second touch electrode units 22 along the first direction. In this configuration, the first touch electrode units 21 are located at the first display area 11, and the second touch electrode units 22 and the third touch electrode units 23 are located at the second display area. Accordingly, separate touch detection of the first display area and the second display area may be realized.

In the configuration shown in FIG. 8, the first touch electrode unit 21 is arranged on at least one side of the second touch electrode units 22 along the first direction, and the orthographic projections of the first touch electrode unit 21 and the second touch electrode units 22 on the base substrate do not overlap. Based on the existing layout of mutual-capacitive touch electrodes, the configuration shown in FIG. 8 may be achieved by reserving a certain space for disposing the first touch electrode units 21. Accordingly, a manufacturing process for introducing the first touch electrode unit into the display panel may be simplified, and the production efficiency of the display panel may be improved.

Figure 9:
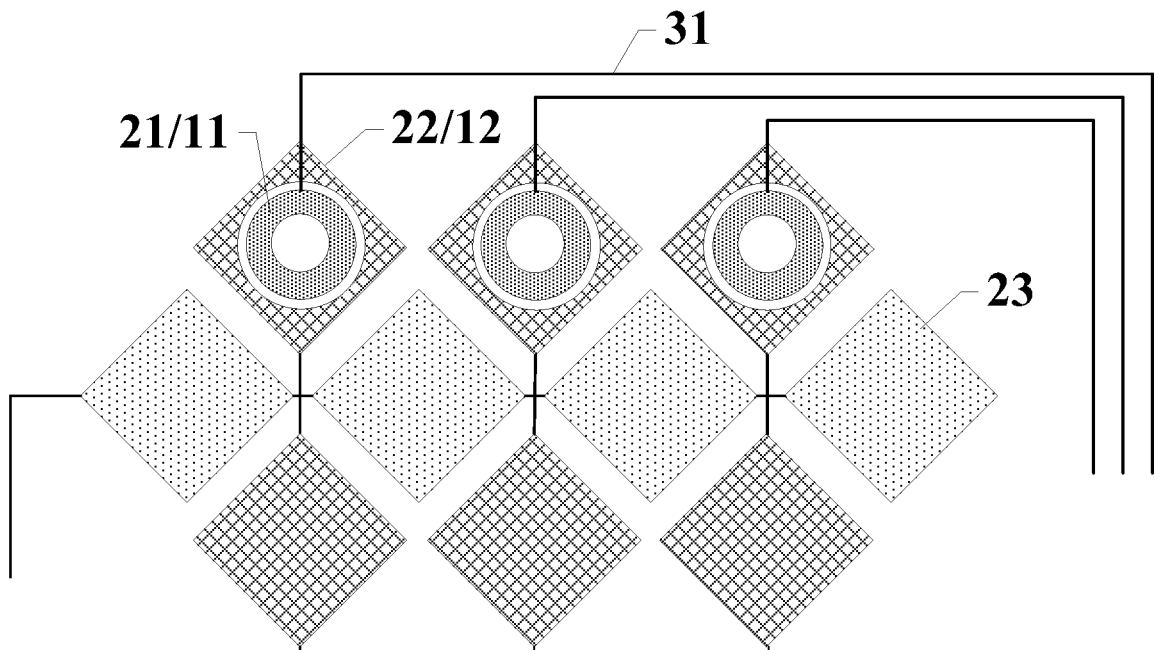
FIG. 9 illustrates relative positional relationships between first touch electrodes and second touch electrodes, consistent with the disclosed embodiments of the present disclosure.

FIG. 9 illustrates relative positional relationships between the first touch electrodes and the second touch electrodes. In one embodiment of the present disclosure, referring to FIG. 9, the orthographic projection of at least one second touch electrode unit 22 on the base substrate at least partially surrounds the orthographic projection of one first touch electrode unit 21 on the base substrate.

Specifically, as shown in FIG. 9, the orthographic projection of each first touch electrode unit 21 on the base substrate is respectively surrounded by the orthographic projection of a second touch electrode unit 22 on the base substrate. It may be understood that in this configuration, the first touch electrode unit 21 and the second touch electrode unit 22 are insulated from each other, and the orthographic projections of the first touch electrode unit 21 and the second touch electrode unit 22 on the base substrate do not overlap with each other. As shown in FIG. 9, there is a gap between the first touch electrode unit 21 and the second touch electrode unit 22. In this configuration, the first display area 11 corresponds to the area where the first touch electrode unit 21 is located, and the area where the second touch electrode unit 22 surrounding the first touch electrode unit 21 is disposed is at the second display area 12. In this way, in the area where the first touch electrode unit 21 and the second touch electrode unit 22 surrounding the first touch electrode unit 21 are located, a touch detection mode by combination of self-capacitance and mutual-capacitance may be realized. Accordingly, accuracy of the touch detection may be improved.

In one embodiment, as shown in FIG. 9, the orthographic projection of the second touch electrode unit 22 on the base substrate completely surrounds the first touch electrode unit 21. In some other embodiments of the present disclosure, the orthographic projection of the second touch electrode unit 22 on the base substrate may half-surround the first touch electrode unit 21. The present disclosure does not limit whether the orthographic projection of the second touch electrode unit 22 on the base substrate completely surrounds the first touch electrode unit 21.

Figure 10:
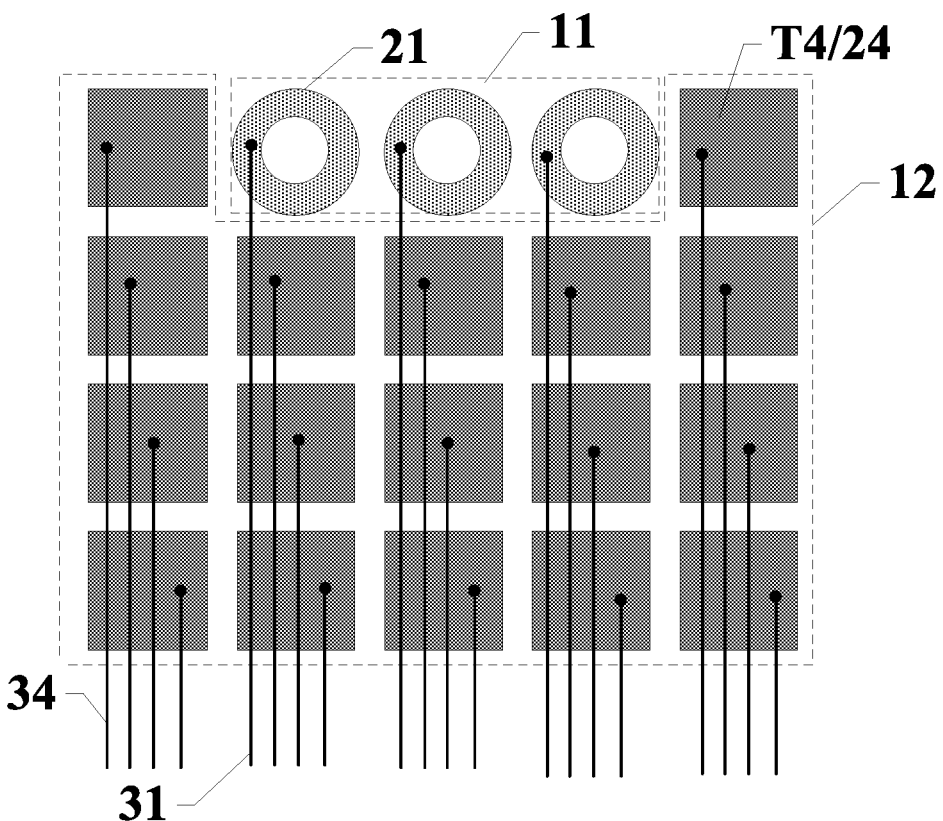
FIG. 10 illustrates another arrangement diagram of touch electrodes on a display panel, consistent with the disclosed embodiments of the present disclosure.

FIG. 10 illustrates another arrangement diagram of touch electrodes on a display panel, consistent with the disclosed embodiments of the present disclosure. In one embodiment of the present disclosure, referring to FIG. 10, the touch electrodes also include a fourth touch electrode T4 located in the second display area 12, and the fourth touch electrode T4 is a self-capacitive touch electrode.

The fourth touch electrode T4 includes a plurality of fourth touch electrode units 24, and the display panel 100 includes a plurality of fourth touch leads 34. The fourth touch electrode units 24 and the fourth touch leads 34 are electrically connected in a one-to-one correspondence.

Specifically, as shown in FIG. 10, the fourth touch electrode T4 in the second display area 12 is a self-capacitive touch electrode. The fourth touch electrode T4 includes a plurality of fourth touch electrode units 24 arranged in an array. Each fourth touch electrode unit 24 is electrically connected to a different fourth touch lead 34 in a one-to-one correspondence. Each fourth electrode unit 24 may receive or send touch signals through the fourth touch lead 34 electrically connected to the fourth electrode unit 24. In this configuration, the touch electrodes at the first display area 11 and the second display area 12 are all self-capacitive touch electrodes. Since all the touch electrodes are self-capacitive, each touch electrode unit of the touch electrodes may be disposed on a same film layer. Accordingly, the film structure of the display panel 100 may be simplified, an manufacturing process of the touch function electrodes may be simplified, and thus production efficiency of the display panel 100 may be improved.

In one embodiment, as shown in FIG. 10, the fourth touch electrode units 24 have a square shape. In some other embodiments of the present disclosure, the fourth touch electrode units may have circular or other shapes. This present disclosure does not limit the shapes of the fourth touch electrode units.

In one embodiment of the present disclosure, referring to FIG. 2, in the display panel 100, the first touch electrode unit 21 located in the first display area 11 may have a hollow ring structure.

Specifically, referring to FIG. 2, in the display panel 100, a hollowed part 20 is formed on the first touch electrode unit 21, such that the first touch electrode T1 forms a hollow ring structure. When a light-capturing component is introduced at a side of the display panel 100 away from the light-emitting surface, the light-capturing component may be disposed at a center position of the orthographic projection of the hollow ring structure on the base substrate. Thus, the light-capturing component may sense light at a position corresponding to the hollow part 20. Accordingly, the light transmittance at the hollow part 20 may be improved, and the light sensitivity of the light-capturing component may be improved.

In one embodiment, a center of the orthographic projection of the hollowed part 20 on the base substrate coincides with a center of the orthographic projection of the first touch electrode unit 21 on the base substrate. Accordingly, the first touch electrode unit 21 may have a regular ring structure, thus the manufacturing process of the first touch electrode unit 21 may be simplified, and the sensing uniformity of the first touch electrode unit 21 at the ring-shaped part may be improved.

In one embodiment, as shown in FIG. 2, the first touch electrode unit 21 includes one hollowed part 20. In some other embodiments of the present disclosure, one first touch electrode unit 21 may include two or more hollowed parts 20, and positions of the hollowed parts 20 on the first touch electrode unit 21 may be arranged according to actual conditions. The present disclosure does not limit the number and positions of the hollowed parts 20.

Figure 11:
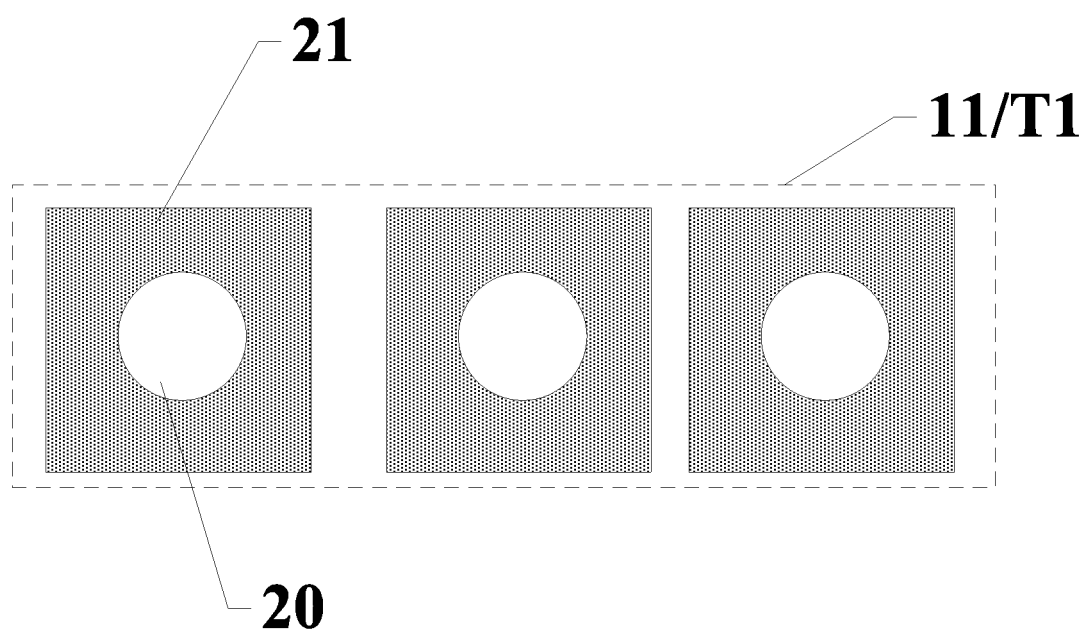
FIG. 11 illustrates another structural diagram of a first touch electrode in a first display area, consistent with the disclosed embodiments of the present disclosure.

In one embodiment, as shown in FIG. 2, the orthographic projection of the first touch electrode unit 21 on the base substrate has a circular shape. In some other embodiments of the present disclosure, the orthographic projection of the first touch electrode unit 21 on the base substrate may have a rectangular, elliptical or other shape. The present disclosure does not limit the shape of the orthographic projection of the first touch electrode unit 21 on the base substrate. FIG. 11 illustrates another structural diagram of a first touch electrode in a first display area, consistent with the disclosed embodiments of the present disclosure. In one embodiment, as shown in FIG. 11, the first touch electrode unit 21 may have a square outline, and the corresponding hollowed part 20 may have a circular shape.

In one embodiment of the present disclosure, as shown in FIG. 2, the first touch electrode unit 21 includes an electrode portion 28 surrounding a hollowed part 20. An area of the electrode portion 28 satisfies: $S=C*d/(\epsilon 0*\epsilon r)$, where C is the capacitance formed between a touch object and the first touch electrode unit 21, d is the distance between the touch object and the first touch electrode unit 21, $\epsilon 0$ is the absolute permittivity (or permittivity in a vacuum), and $\epsilon r$ is the relative permittivity of the cover plate. The capacitance C is in a range of approximately 0.25 pF to 0.4 pF.

Specifically, an occupied area of the first touch electrode unit 21 on the display panel 100 may be small. In one embodiment, the outline of the orthographic projection of the first touch electrode unit 21 on the base substrate of the display panel 100 is a circle with a radius about 2.5 mm. When a touch object (for example, a finger) touches the first display area 11, the touch object may cover the outline of the orthographic projection of the first touch electrode unit 21 on the base substrate. In this case, the area of the electrode portion 28 of the first touch electrode unit 21 is a facing area between the touch object and the first touch electrode T1. According to the capacitance formula, the area of the electrode portion 28 may be obtained by $S=C*d/(\epsilon 0*\epsilon r)$. If the capacitance formed between the touch object and the first touch electrode unit is less than approximately 0.25 pF, when a touch occurs, the capacitance change between the touch object and the first touch electrode unit may be small, and thus the touch sensitivity may be low. If the capacitance formed between the touch object and the first touch electrode unit 21 is greater than approximately 0.4 pF, the area of the electrode portion 28 may be large, and thus the light transmittance of the first display area 11 may be low. In the present disclosure, the capacitance formed between the touch object and the first touch electrode unit 21 may be in a range of approximately 0.25 pF and 0.4 pF. As such, the first touch electrode unit 21 in the first display area 11 may have a high touch sensitivity. Meanwhile, since the area of the electrode portion 28 of the first touch electrode unit may not be too large, the first display area 11 may have a high light transmittance.

In one embodiment of the present disclosure, as shown in FIG. 2, the electrode portion 28 may have a metal mesh structure. Specifically, the first display area 11 may have display, touch, and light transmission functions. A plurality of pixel units is disposed in the first display area 11 to perform the display function. The electrode portion 28 of the first touch electrode unit in the first display area 11 may have a metal mesh structure, and metal lines of the electrode portion 28 may be arranged around the pixel units, such that the metal lines may not affect the normal display of the pixel units. In addition, the electrode portion 28 may have a metal mesh structure. Since an electrode with metal material may have high touch sensitivity, the touch sensitivity of the first display area 11 may be improved by using a metal mesh structure.

In one embodiment of the present disclosure, as shown in FIG. 2, the electrode portion 28 may be a planar transparent electrode. Specifically, in the first display area 11, the electrode portion 28 of the first touch electrode unit 21 may be a transparent electrode. For example, a material with high light transmittance such as Indium Tin Oxides (ITO) may be used. In this way, the touch function of the first display area 11 may be realized, and the light transmittance of the first display area 11 may be improved.

Figure 12:
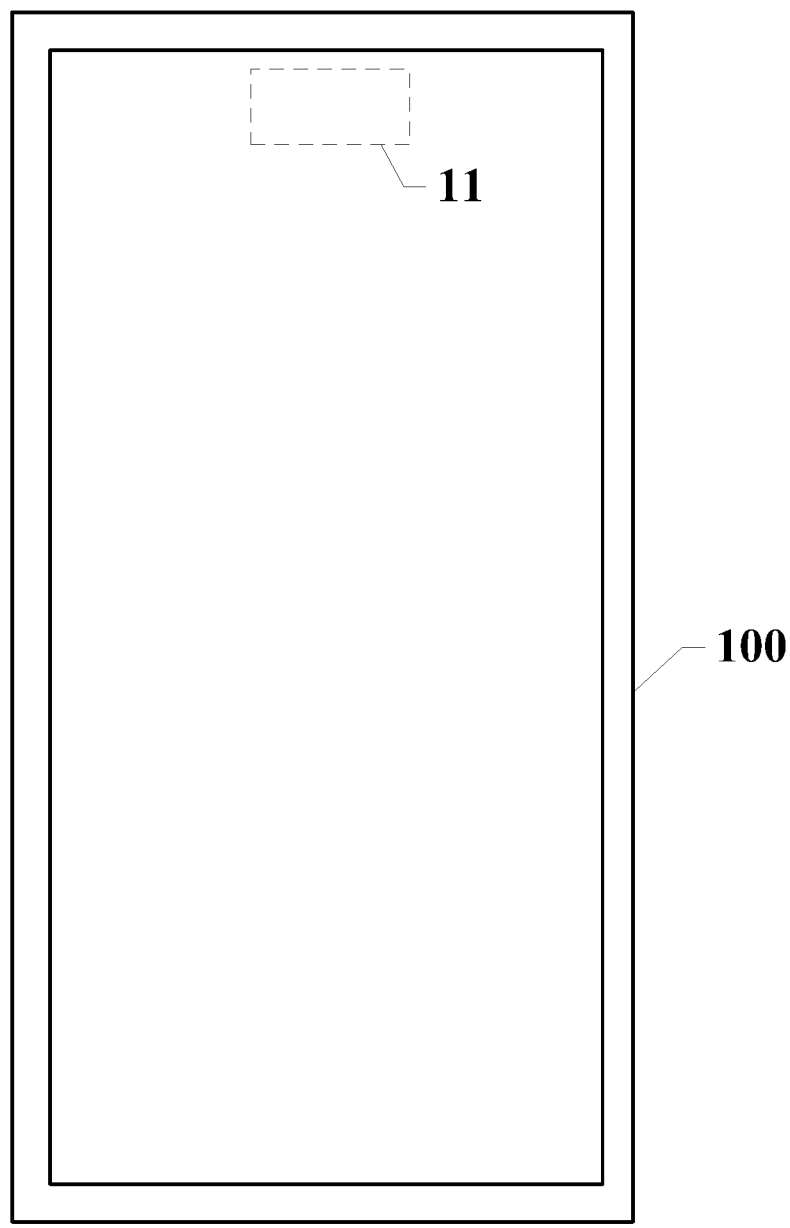
FIG. 12 illustrates a structural diagram of a display device consistent with the disclosed embodiments of the present disclosure.
Figure 13:
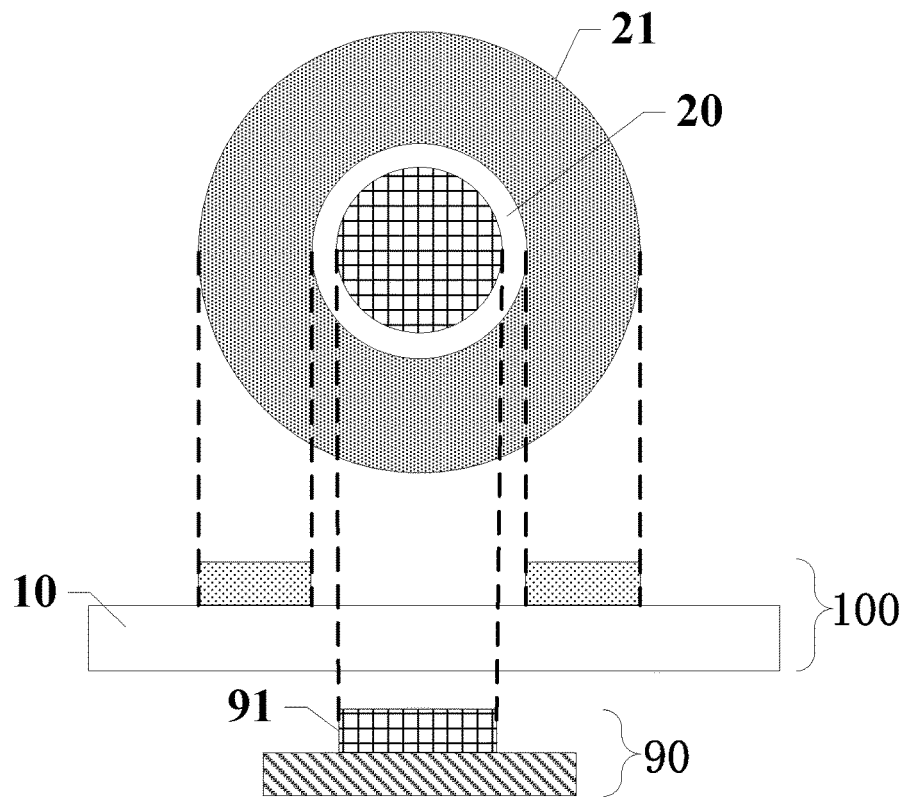
FIG. 13 illustrates a positional diagram of a first touch electrode and a light-capturing component in a first display area of the display device illustrated in FIG. 12, consistent with the disclosed embodiments of the present disclosure.

The present disclosure also provides a display device. FIG. 12 illustrates a structural diagram of a display device consistent with the disclosed embodiments of the present disclosure. FIG. 13 illustrates a positional diagram of a first touch electrode T1 and a light-capturing component 90 in a first display area 11 of the display device illustrated in FIG. 12, consistent with the disclosed embodiments of the present disclosure. The display device 200 includes a light-capturing component 90 and a display panel 100 provided by the present disclosure, and the light-capturing component 90 is located on a side of the display panel 100 away from the light-exiting surface. The light-capturing component 90 includes a light-capturing unit 91, and an orthographic projection of the light-capturing unit 91 on the base substrate 10 is located within a range of an orthographic projection of a hollowed part 20 of the first touch electrode unit 21 on the base substrate 10.

Specifically, referring to FIG. 12 and FIG. 13, in the display device 200 provided by the present disclosure, the light-capturing component 90 is disposed at a position corresponding to the first display area 11. In the first display area 11, the area corresponding to the hollowed part 20 may have the highest light transmittance. In the present disclosure, the orthographic projection of the light-capturing unit 91 in the light-capturing component 90 on the base substrate 10 is within the orthographic projection area of the hollowed part 20 of the first touch electrode unit 21 on the base substrate 10. Accordingly, during a light-capturing process of the light-capturing component 90, more light may be transmitted to the light-capturing component 90 through the hollowed part 20. Accordingly, light-amount requirements of the light-capturing component 90 may be met, and thus performance of the light-capturing component 90 may be improved.

In one embodiment of the present disclosure, the light-capturing component 90 may include at least one type of light sensors including a camera and an infrared sensor. When the light-capturing component 90 includes a camera, an orthographic projection of the camera on the base substrate 10 is within the orthographic projection area of the hollowed part 20 of the first touch electrode unit 21 on the base substrate 10. In this configuration, light may be transmitted from an area corresponding to the hollow part 20 to the camera, such that the camera may obtain more light, and the shooting performance of the camera may be improved. Similarly, when the light-capturing component 90 includes an infrared sensor, an orthographic projection of the infrared sensor on the base substrate 10 is within the orthographic projection area of the hollowed part 20 of the first touch electrode unit 21 on the base substrate 10. External light may be transmitted to the infrared sensor through the corresponding area of the hollowed part 20, such that the infrared sensor may sense more light, and photosensitive performance of the infrared sensor may be improved.

It should be noted that the display device 200 provided by the present disclosure may include a plurality of light-capturing components 90 simultaneously, for example, a camera and an infrared sensor. Orthographic projections of the light-capturing units 91 of the light-capturing components 90 on the base substrate 10 may be all within the orthographic projection area of the hollowed part 20 of the first touch electrode unit 21 on the base substrate 10. Amounts of light received by the light-capturing units 91 may be increased, and thus performances of the light-capturing units 91 may be improved.

Figure 14:
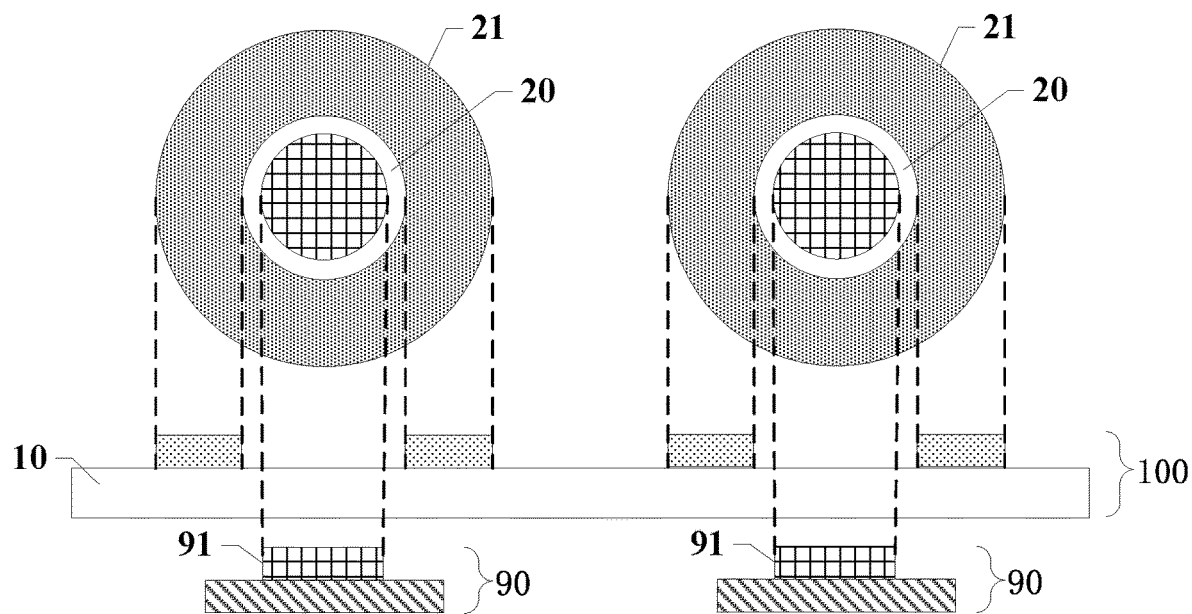
FIG. 14 illustrates another positional diagram a first touch electrode and a light-capturing component in a first display area of a display device illustrated in FIG. 12, consistent with the disclosed embodiments of the present disclosure.

FIG. 14 illustrates another positional diagram showing a first touch electrode T1 and a light-capturing component 90 in a first display area of a display device illustrated in FIG. 12, consistent with the disclosed embodiments of the present disclosure. In one embodiment of the present disclosure, each first touch electrode unit 21 includes a hollowed part 20, and the number of light-capturing units 91 is same as the number of first touch electrode units 21.

Specifically, FIG. 14 shows a configuration where the first touch electrode T1 in the first display area 11 includes two first touch electrode units 21, and each first touch electrode unit 21 includes a hollowed part 20. In this configuration, the display device 200 includes two light-capturing units 91. The orthographic projection of each light-capturing unit 91 on the base substrate 10 is located in an orthographic projection area of the hollowed part 20 of a different first touch electrode unit 21 on the base substrate 10. Accordingly, different types of light-capturing units 91 may be integrated into the display device 200, such that the display device 200 may meet the needs for diversified functions.

Figure 15:
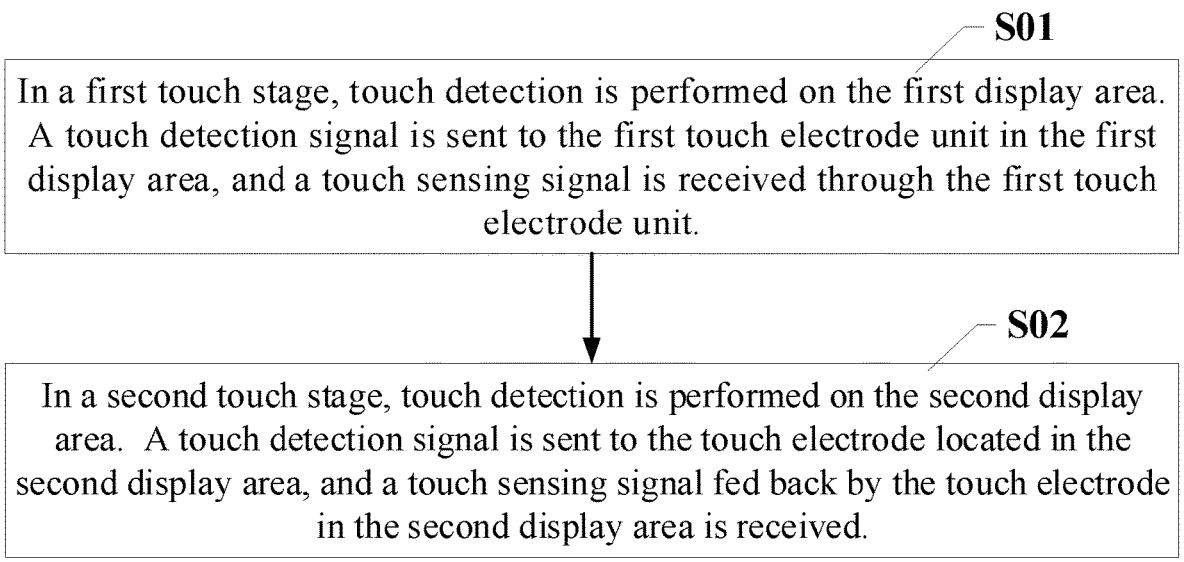
FIG. 15 illustrates a flowchart of a control method for a display panel consistent with the disclosed embodiments of the present disclosure.

The present disclosure also provides a control method for the display panel 100. FIG. 15 illustrates a flowchart of a control method for a display panel 100 consistent with the disclosed embodiments of the present disclosure. The control method may be used to control the display panel 100 provided by any of the disclosed embodiments of the present disclosure. With reference to FIG. 1, FIG. 2 and FIG. 15, the control method includes a first touch stage and a second touch stage.

In the first touch stage (S01), touch detection is performed on the first display area 11. Touch detection signals may be sent to the first touch electrode unit 21 in the first display area 11, and touch sensing signals may be received through the first touch electrode unit 21.

In the second touch stage (S02), touch detection is performed on the second display area 12. Touch detection signals may be sent to the touch electrodes located in the second display area 12, and touch sensing signals fed back by the touch electrodes in the second display area 12 may be received.

Specifically, with references to FIG. 1, FIG. 2 and FIG. 15, the control method for the display panel 100 provided by the present disclosure includes a first touch stage and a second touch stage. In the first touch stage, touch detection is performed on the first display area 11, and in the second touch stage, touch detection is performed on the second display area 12. Since the first touch electrode T1 in the first display area 11 is a self-capacitive touch electrode, the reception and transmission of touch signals are performed by the first touch electrode unit 21. That is, in the first touch stage, a touch detection signal may be sent to the first touch electrode unit 21 in the first display area 11, and the first touch electrode unit 21 senses external touch and feeds back the touch sensing signal. Since the first touch electrode T1 in the first display area 11 is a self-capacitive touch electrode, a manufacturing process of the first touch electrode T1 may be simplified, touch performance of the first display area 11 may be ensured, and production yield of the display panel may be improved.

It should be noted that, in the control method for the display panel 100 provided by the present disclosure, there is no strict sequence between the first touch stage and the second touch stage. In an actual application process, based on the relationship between the touch electrodes in the first display area 11 and the second display area 12, the two touch stages may be executed simultaneously or by time-sharing.

In one embodiment of the present disclosure, with reference to FIG. 5 and FIG. 15, the touch electrodes also include a plurality of second touch electrodes T2 and a plurality of third touch electrodes T3 located in the second display area 12. Each second touch electrode T2 includes a plurality of second touch electrode units 22 that are electrically connected, and each third touch electrode T3 includes a plurality of third touch electrode units 23 that are electrically connected. The display panel 100 further includes a plurality of second touch leads 32 and a plurality of third touch leads 33. Each second touch electrode T2 is electrically connected to a different second touch lead 32, and each third touch electrode T3 is electrically connected to a different third touch lead 33. One first touch electrode unit 21 may be electrically connected to any second touch electrode unit 22 in a same second touch electrode T2. The second touch electrode T2 electrically connected to the first touch electrode unit 21 may be multiplexed as the first touch lead 31 electrically connected to the first touch electrode unit 21.

In the first touch stage, touch detection signals may be sent to the first touch electrode unit 21 through the second touch electrode T2 electrically connected to the first touch electrode unit 21; and touch sensing signals fed back by the first touch electrode unit 21 may be received through the second touch electrode T2 electrically connected to the first touch electrode unit 21.

In the second touch stage, the touch detection signals may be sent to the third touch electrode T3, and the touch sensing signals may be received through the second touch electrode T2. The first touch stage and the second touch stage may be executed by time-sharing.

Specifically, in one embodiment, as shown in FIG. 5, each first touch electrode unit 21 is electrically connected to a second touch electrode unit 22 of a different second touch electrode T2. Accordingly, the electrical connection between the first touch electrode unit 21 and the second touch electrode T2 is established. In the first touch stage, the second touch electrode T2 electrically connected to the first touch electrode unit 21 may be multiplexed as the first touch lead 31 of the first touch electrode unit 21. In this way, a touch detection signal may be sent to the first touch electrode unit 21 through the second touch electrode T2 that is electrically connected to the first touch electrode unit 21, and a touch sensing signal may be fed back through the second touch electrode T2. Accordingly, there may be no need to separately fabricate first touch leads 31 for the first touch electrode units 21, and the second touch electrodes T2 in the second display area 12 may be multiplexed as the first touch leads 31. As such, a manufacturing process of the display panel 100 may be simplified and production efficiency of the display panel 100 may be improved.

It should be noted that when the second electrodes in the second display area 12 are multiplexed as the touch leads of the first touch electrodes T1 in the first display area 11, the second touch stage and the first touch stage may be executed by time-sharing. The second touch electrodes T2 may be multiplexed as the first touch leads 31 to transmit signal in the first touch stage, and may be used as touch electrodes to perform touch recognition in the second touch stage. Thus, effective and reliable execution of the first touch stage and the second touch stage may be ensured, and touch detection reliability of the display panel 100 may be improved.

When the first touch stage and the second touch stage are executed by time-sharing, within a same time frame, the first touch stage may be executed first and then the second touch stage may be executed; or the second touch stage may be executed first, and then the first touch stage may be executed. The present disclosure does not limit the execution sequence of the first touch stage and the second touch stage.

In one embodiment of the present disclosure, with reference to FIG. 8 and FIG. 9, the first touch leads 31 may be separately disposed for the first touch electrode units 21, and the second touch electrodes T2 in the display panel 100 may not need to be multiplexed as the first touch leads 31. In this way, in the first touch stage, touch detection signals may be sent to the first touch electrode units 21 through the first touch leads 31 electrically connected to the first touch electrode units 21; and touch sensing signals fed back by the first touch electrode units 21 may be received through the first touch lead 31s electrically connected to the first touch electrode unit 21. In the second touch stage, touch detection signals may be sent to the third touch electrodes T3, and touch sensing signals may be received through the second touch electrodes T2. Since the second touch electrodes T2 are not multiplexed as the first touch leads 31, the first touch stage and the second touch stage may be executed simultaneously or by time-sharing. When the first touch stage and the second touch stage are executed simultaneously, the time duration occupied by the first touch stage and the second touch stage within a time frame may be reduced. Accordingly, execution times of the first touch stage and the second touch stage within a unit time may be increased, and touch performance of the display panel may thus be improved.

In some embodiments, as shown in FIG. 5 and FIG. 8, the first touch electrodes T1 in the first display area 11 are self-capacitive touch electrodes, and correspondingly the first touch stage is a self-capacitance touch detection stage. The touch electrodes in the second display area 12 are mutual capacitance touch electrodes, and correspondingly the second touch stage is a mutual capacitance touch detection stage.

In some other embodiments of the present disclosure, the touch electrodes in the second display area 12 may also be self-capacitive touch electrodes. With reference to FIG. 10 and FIG. 15, the touch electrodes also include fourth touch electrodes T4 in the second display area 12. Each fourth touch electrode T4 includes a plurality of fourth touch electrode units 24. The first touch electrodes T1 and the fourth touch electrodes T4 are all self-capacitive touch electrodes. The display panel 100 also includes a plurality of fourth touch leads 34, and the fourth touch electrode units 24 and the fourth touch leads 34 are electrically connected in a one-to-one correspondence.

In the second touch stage, touch detection signals may be sent to the fourth touch electrode units 24 located in the second display area 12 through the fourth touch leads 34, and touch sensing signals fed back by the fourth touch electrode units 24 may be received through the fourth touch leads 34.

Specifically, in one embodiment, as shown in FIG. 10, the fourth touch electrode T4 in the second display area 12 is self-capacitive, and the fourth touch electrode T4 includes a plurality of fourth touch electrode units 24. Each fourth touch electrode unit 24 is electrically connected to a different fourth touch lead 34 in a one-to-one correspondence. In the second touch stage, touch detection signals may be sent to the fourth touch electrode unit 24 through the fourth touch lead 34, and each fourth touch electrode unit 24 may feed back touch sensing signals through the fourth touch lead 34. The fourth touch lead 34 corresponding to the fourth touch electrode unit 24 and the first touch lead 31 corresponding to the first touch electrode unit 21 are independent of each other. The touch stages in the first display area 11 and the second display area 12 do not interfere with each other. Since both the first touch electrodes T1 in the first display area 11 and the fourth touch electrodes T4 in the second display area 12 are self-capacitive touch electrodes, each touch electrode unit constituting the touch electrodes may be disposed on a same film layer. Accordingly, a film structure of the display panel 100 may be simplified, a manufacturing process of the touch electrodes may be simplified, and production efficiency of the display panel 100 may thus be improved.

In one embodiment of the present disclosure, in the control method for the display panel, the first touch stage and the second touch stage may be executed simultaneously.

Specifically, with reference to FIG. 8 and FIG. 10, the touch electrode units in the first display area are electrically connected to the first touch leads 31 that are separately disposed. Since the second touch electrodes T2 may not be multiplexed as the first touch leads, the first touch stage and the second touch stage may be executed simultaneously. In this way, the time duration occupied by the first touch stage and the second touch stage within a time frame may be reduced. Accordingly, execution times of the first touch stage and the second touch stage within a unit time may be increased, and touch performance of the display panel may thus be improved.

As disclosed, the technical solutions of the present disclosure have the following advantages.

In the display panel and the control method thereof, and the display device provided by the present disclosure, the display area of the display panel includes a first display area and a second display area at least partially surrounding the first display area. Touch electrodes are disposed at least in the first display area and the second display area. The touch electrodes located in the first display area are first touch electrodes. The first touch electrodes are self-capacitive, and each first touch electrode includes at least one touch electrode unit. In particular, the first touch electrode unit includes at least one hollowed part running through the first touch electrode unit. Because of the hollowed part on the first touch electrode unit, an actual coverage area of the first touch electrode in the first display area may be reduced, and thus light transmittance of the first display area may be improved. As such, the first display area may have both touch control function and high light transmittance. In addition, since the first touch electrodes in the first display area may be self-capacitive, a manufacturing process of the first touch electrodes may be simplified, touch performance of the first display area may be improved, and production yield of the display panel may be improved.

The embodiments disclosed herein are exemplary only and not limiting the scope of this disclosure. Various combinations, alternations, modifications, equivalents, or improvements to the technical solutions of the disclosed embodiments can be obvious to those skilled in the art. Without departing from the spirit and scope of this disclosure, such combinations, alternations, modifications, equivalents, or improvements to the disclosed embodiments are intended to be encompassed within the scope of the present disclosure.

What is claimed is:

1. A display panel, comprising:
a display area and a non-display area;
a base substrate; and
touch electrodes on a side of the base substrate facing a light-exiting surface of the display panel,
wherein:
the display area includes a first display area and a second display area that at least partially surrounds the first display area;
the touch electrodes are at least distributed in the display area;
the touch electrodes at least include a first touch electrode located in the first display area;
the first touch electrode includes at least one first touch electrode unit, and the first touch electrode unit includes at least one hollowed part;
along a direction perpendicular to the base substrate, the hollowed part runs through the first touch electrode unit;
the first touch electrode is a self-capacitive touch electrode; and
the first touch electrode unit includes an electrode portion surrounding the hollowed part, and an area S of the electrode portion satisfies: S=C*d/(ε0*εr),
wherein:
C is a capacitance formed between a touch object and the first touch electrode unit, wherein 0.25 pF≤C≤0.4 pF;
d is a distance between the touch object and the first touch electrode unit; and
ε0 is permittivity in a vacuum, and εr is a relative permittivity of a cover plate of the display panel.

2. The display panel according to claim 1, wherein:
the touch electrodes further include a plurality of second touch electrodes and a plurality of third touch electrodes located in the second display area;
each second touch electrode of the plurality of second touch electrodes includes a plurality of second touch electrode units that are electrically connected, and each third touch electrode of the plurality of third touch electrodes includes a plurality of third touch electrode units that are electrically connected;
the plurality of second touch electrode units in a same second touch electrode are arranged along a first direction, and the plurality of third touch electrode units in a same third touch electrode are arranged along a second direction, wherein the first direction and the second direction intersect with each other;
the display panel further includes a plurality of second touch leads and a plurality of third touch leads; and
each second touch electrode of the plurality of second touch electrodes is electrically connected to a different second touch lead of the plurality of second touch leads respectively, and each third touch electrode of the plurality of third touch electrodes is electrically connected to a different third touch lead of the plurality of third touch leads respectively.

3. The display panel according to claim 2, wherein:
the display panel further includes a plurality of first touch leads;
each first touch electrode unit is electrically connected to a different first touch lead of the plurality of first touch leads respectively;
each first touch electrode unit is electrically connected to a different second touch electrode by electrically connecting the first touch electrode unit to any one of the second touch electrode units of the second touch electrode; and
the second touch electrode electrically connected to the first touch electrode unit is multiplexed as the first touch lead electrically connected to the first touch electrode unit.

4. A display panel according to claim 2, wherein:
the display panel further includes a plurality of first touch leads;
each first touch electrode unit is electrically connected to a different first touch lead of the plurality of first touch leads respectively; and
the first touch electrode units are insulated from the plurality of second touch electrode units and the plurality of third touch electrode units.

5. The display panel according to claim 2, wherein:
along the first direction, the first touch electrode unit is located on a side of at least one second touch electrode unit; and
orthographic projections of the first touch electrode unit and the second touch electrode unit on the base substrate do not overlap.

6. The display panel according to claim 2, wherein:
an orthographic projection of at least one second touch electrode unit on the base substrate at least partially surrounds an orthographic projection of the first touch electrode unit on the base substrate.

7. The display panel according to claim 1, wherein:
the touch electrodes further include fourth touch electrodes located in the second display area, and the fourth touch electrodes are self-capacitive touch electrodes;
each fourth touch electrode includes a plurality of fourth touch electrode units;
the display panel includes a plurality of fourth touch leads; and
the plurality of fourth touch electrode units and the plurality of fourth touch leads are electrically connected in a one-to-one correspondence.

8. A display panel according to claim 1, wherein the first touch electrode unit has a hollow ring structure.

9. The display panel according to claim 1, wherein the electrode portion has a metal mesh structure.

10. The display panel according to claim 1, wherein the electrode portion is a planar transparent electrode.

11. A display device, comprising
a display panel including a display area and a non-display area, a base substrate, and touch electrodes on a side of the base substrate facing a light-exiting surface of the display panel, wherein the display area includes a first display area and a second display area that at least partially surrounds the first display area, the touch electrodes are at least distributed in the display area, the touch electrodes at least include a first touch electrode located in the first display area, the first touch electrode includes at least one first touch electrode unit, and the first touch electrode unit includes at least one hollowed part, along a direction perpendicular to the base substrate, the hollowed part runs through the first touch electrode unit, and the first touch electrode is a self-capacitive touch electrode; and
a light-capturing component,
wherein:
the light-capturing component is located on a side of the display panel away from the light-exiting surface;
the light-capturing component includes a light-capturing unit; and
an orthographic projection of the light-capturing unit on the base substrate falls within a range of an orthographic projection of the hollowed part of the first touch electrode unit on the base substrate.

12. The display device according to claim 11, wherein the light-capturing component includes at least one of a camera or an infrared sensor.

13. The display device according to claim 11, wherein:
each first touch electrode unit includes one hollowed part; and
a number of the light-capturing units is same as a number of the first touch electrode units.

14. A control method of a display panel, comprising:
a first touch stage and a second touch stage, wherein:
the display panel includes a display area and a non-display area, a base substrate, and touch electrodes on a side of the base substrate facing a light-exiting surface of the display panel, wherein the display area includes a first display area and a second display area that at least partially surrounds the first display area, the touch electrodes are at least distributed in the display area, the touch electrodes at least include a first touch electrode located in the first display area and a second touch electrode in the second display area, the first touch electrode includes at least one first touch electrode unit, and the first touch electrode unit includes at least one hollowed part, along a direction perpendicular to the base substrate, the hollowed part runs through the first touch electrode unit, and the first touch electrode is a self-capacitive touch electrode;
in the first touch stage, a touch detection is performed on the first display area, wherein a touch detection signal is sent to the first touch electrode unit including at least one hollowed part in the first display area, and a touch sensing signal is received through the first touch electrode unit; and
in the second touch stage, a touch detection is performed on the second display area, wherein a touch detection signal is sent to the second touch electrode located in the second display area, and a touch sensing signal fed back by the second touch electrode in the second display area is received.

15. The control method according to claim 14, wherein:
the touch electrodes further include a plurality of second touch electrodes and a plurality of third touch electrodes located in the second display area, wherein each second touch electrode of the plurality of second touch electrodes includes a plurality of second touch electrode units that are electrically connected, and each third touch electrode of the plurality of third touch electrodes includes a plurality of third touch electrode units that are electrically connected;
the display panel further includes a plurality of second touch leads and a plurality of third touch leads, wherein each second touch electrode of the plurality of second touch electrodes is electrically connected to a different second touch lead, and each third touch electrode of the plurality of third touch electrodes is electrically connected to a different third touch lead;
each first touch electrode unit is electrically connected to a different second touch electrode by electrically connecting the first touch electrode unit to any one of the second touch electrode units of the second touch electrode, and the second touch electrode electrically connected to the first touch electrode unit is multiplexed as a first touch lead electrically connected to the first touch electrode unit;
in the first touch stage, the touch detection signal is sent to the first touch electrode unit through the second touch electrode electrically connected to the first touch electrode unit, and the touch sensing signal fed back by the first touch electrode is received through the second touch electrode electrically connected to the first touch electrode unit;

in the second touch stage, the touch detection signal is sent to the third touch electrode, and the touch sensing signal is received through the second touch electrode; and the first touch stage and the second touch stage are executed by time-sharing.

16. The control method according to claim 14, wherein:

the touch electrodes further include a fourth touch electrode in the second display area, wherein the first touch electrode and the fourth touch electrode are self-capacitive touch electrodes, and the fourth touch electrode includes a plurality of fourth touch electrode units;

the display panel further includes a plurality of fourth touch leads, and the plurality of fourth touch electrode units and the plurality of fourth touch leads are electrically connected in a one-to-one correspondence; and in the second touch stage, the touch detection signal is sent to the fourth touch electrode units located in the second display area through the fourth touch leads, and the touch sensing signal fed back by the fourth touch electrode units is received through the fourth touch leads.

17. The control method according to claim 16, wherein the first touch stage and the second touch stage are executed simultaneously.

* * * * *